United States Patent Office.

JOSEPH STRIGEL, OF LOUISVILLE, KENTUCKY.

Letters Patent No. 67,082, dated July 23, 1867.

IMPROVED DISINFECTING AND ANTISEPTIC COMPOUND.

*The Schedule referred to in these Letters Patent and making part of the same.*

TO ALL WHOM IT MAY CONCERN:

Be it known that I, JOSEPH STRIGEL, of the city of Louisville, county of Jefferson, and State of Kentucky, have invented a new and useful Disinfecting and Antiseptic Compound for fumigating houses, rooms, cars, steamboats, and ships, and for destroying, by (process of fumigation,) infection, and the causes of infection, contagious, malarious, and epidemic diseases attached to beds, bed-clothing, wearing apparel, furniture, structures, and commodities, so that the contagious nature of disease will be arrested, and its communicability and spread prevented; and I do hereby declare that the following is a full, clear, and exact description of the ingredients used in the preparation thereof.

The ingredients of said compound are as follows: First, of common horn shavings (1) one pound, of liquor ammonia succinici ($\frac{1}{8}$) one-eighth of one ounce, of pulverized juniper berries (56) fifty-six grains; or, second, of common horn shavings one hundred and twenty-five parts, of liquor ammonia succinici one and one-sixteenth part, of pulverized juniper berries one part.

The compound is prepared by drying the horn well before a hot fire, and then reducing it to small, thin shavings, and mixing well the other ingredients with the same, and when the whole is perfectly dry, the compound is ready for use.

The use of the compound is as follows: On the approach of disease, or when there is reason to fear its attack, this disinfecting compound should be thoroughly used in the following manner, viz, close the doors, windows, or other apertures of the room or apartment to be fumigated, put a teaspoonful of the compound on burning charcoal, placed in the middle of the room or apartment. After the lapse of one hour the door, windows, &c., may be opened. Disinfection will then be accomplished, and a pure and wholesome atmosphere, freed from all germs of disease, will fill the room, and secure the inmates against all infection.

When it is desired to disinfect a house, room, or other apartment, bed-clothes, wearing apparel, furniture, &c., which are infected with or have been exposed to contagious, malarious, or epidemic diseases, use twice the quantity of the disinfecting compound, as before mentioned, and keep the infected rooms or articles exposed to the fumes arising from the same, for one hour, after which no disease whatever will or can be communicated by the use of them.

The fumes arising from this disinfecting compound, when burned upon charcoal, are not only free from any disagreeable or deleterious effects, but are wholesome and preventive of disease, and it is advisable for persons exposed to, or who have been exposed to, causes or influences calculated to bring about disease of the nature before mentioned, to inhale a portion of the said fumes, and to expose their persons to the purifying action of the same.

This compound, when burned on charcoal, is an excellent deodorizer, and when the said compound is used as mentioned above, it will produce all the results hereinabove claimed, and that the fumes arising from the said compound, when burned upon charcoal or heated iron, are disinfecting, and antiseptic, and deodorizing, and that said fumes are wholesome when inhaled, and when they are confined for the time mentioned above, in any room or other apartment, or when any bed, bed-clothing, wearing apparel, furniture, and other articles, which have been exposed to contagious, malarious, or epidemic diseases, are perfectly fumigated with the vapors arising from the said compound, when burning as above mentioned, the effect will be to disinfect them, and prevent communication of disease by the use of or wearing the same.

I claim as my invention the discovery of the use and effect of the horn shavings and drugs mentioned, in the preparation of the said disinfecting and antiseptic compound, when used in the proportions and manner mentioned in the above specification.

JOSEPH STRIGEL.

Witnesses:
   J. G. HARRIS,
   CLIFTON McGINNIS